United States Patent [19]

Cawley et al.

[11] Patent Number: 5,479,210
[45] Date of Patent: Dec. 26, 1995

[54] VIDEO IMAGE PROCESSING SYSTEM HAVING VARIABLE DATA COMPRESSION

[75] Inventors: Robin A. Cawley, Burghclere; Alan L. Stapleton, Newbury; Ian M. Brown, Caversham, all of England

[73] Assignee: Quantel, Ltd., Newbury, England

[21] Appl. No.: 255,260

[22] Filed: Jun. 7, 1994

[30] Foreign Application Priority Data

Jun. 11, 1993 [GB] United Kingdom ................... 9312039

[51] Int. Cl.$^6$ .................................................. H04N 7/12
[52] U.S. Cl. ........................................ 348/390; 348/716
[58] Field of Search .................................... 348/390, 399, 348/420, 716, 718; 358/426; 360/14.1, 9.1, 33.1; H04N 7/12

[56] References Cited

U.S. PATENT DOCUMENTS

| | | | |
|---|---|---|---|
| 5,028,999 | 7/1991 | Vogel | 358/133 |
| 5,079,630 | 6/1992 | Golin et al. | 348/399 |

FOREIGN PATENT DOCUMENTS

| | | | |
|---|---|---|---|
| 0284161 | 9/1988 | European Pat. Off. | H04N 7/13 |
| 0347330 | 12/1989 | European Pat. Off. | H04N 7/137 |
| 0378316 | 7/1990 | European Pat. Off. | H04N 1/41 |
| 0475251 | 3/1992 | European Pat. Off. | H04N 7/133 |
| 0493130 | 7/1992 | European Pat. Off. | H04N 1/41 |

OTHER PUBLICATIONS

Je H. Lee et al., A Study on New DCT-Based Bit Rate Reduction Algorithm and Variable Speed Playback for a Home-Use Digital VCR, Aug. 1992, IEEE Transactions on Consumer Electronics, vol. 58, No. 3, pp. 236–241.

D. Reininger et al., Statistical Multiplexing of VBR MPEG Compressed Video on ATM Networks, IEEE Computer Society Press, Mar. 28, 1993, pp. 919–926 English-language Abstract of European Patent Document No. 0347330, Derwent World Patent Index.

*Primary Examiner*—Victor R. Kostak
*Attorney, Agent, or Firm*—Cooper & Dunham

[57] ABSTRACT

A video image processing system comprises an input cache store for temporarily storing input video data, compressors for compressing image data from the input store and an output store comprising multiple storage areas of known fixed size for storing respective files of compressed data from the compressors. The compressors are arranged to compress each image of the input video data to a given initial degree to produce respective data files. A processor compares the number of bytes in each data file with the known size of one storage area in the output store to determine whether the data file will occupy a predetermined proportion of said storage area. In the event that the data file will not occupy said predetermined portion of said storage area, the processor causes one of the compressors to effect one or more repeat compressions to a different degree in order to produce a data file of a size which will occupy said predetermined proportion of said storage. The system thereby optimises the compression of data and the utilisation of storage in the storing of the compressed data.

11 Claims, 1 Drawing Sheet

VIDEO IMAGE PROCESSING SYSTEM HAVING VARIABLE DATA COMPRESSION

BACKGROUND

1. Field of the Invention

This invention relates to a video image processing system.

2. Description of the Related Art

In a video image processing system video image fields or frames to be processed are represented by digital image data defining a multiplicity of picture elements (pixels) which together form the field or frame. In a 625 line or similarly sized video system each video frame typically requires about 800K Bytes of data to represent all of the pixels forming the frame. Often image processing is applied to selected frames of a video clip comprising multiple frames and in order to facilitate the processing of the clip it is desirable to make available the data representing each frame on a frame random access basis. That is to say the time taken to access data representing any frame in the clip is substantially the same as the time taken to access the data for any other frame in the clip.

Frame random access storage devices are known. One such device comprises multiple disc stores arranged so that together they are able to receive and to output data at video display rate (e.g. 25 or 30 frames per second). Video stores are now available which comprise several disc storage devices connected together in parallel so as to enable several minutes of video to be stored on a frame random access basis. However, the cost of such store devices is relatively high and can be prohibitively expensive.

It is desirable that storage of data representing image sequences should be operated with a fixed file size, that is to say, with a store in which equal capacity is allocated for storage of the data relating to each image of the sequence. Where the stored image data is uncompressed, as is normally the case in an on-line system, such a store is the natural form to be adopted. However, the use of a store of fixed file size in an off-line system, where the image data is compressed before being stored, presents difficulties because the image data compression will result in files of data of different sizes for different images.

In an off-line system the number of video frames storable in a store of a given capacity can be increased (and the amount of storage space required can be reduced) by way of compression of the video data prior to storage. Data compression techniques are now sufficiently advanced to enable video data to be compressed with only small and acceptable losses in the quality of the image when the data is subsequently decompressed.

Generally, when a compression technique is applied to video data, the resulting compressed data bears no visual relation to the original image in the sense that if the compressed data was output directly to a monitor, the resulting image that would be displayed on the monitor would appear nothing like the original image. Indeed, the resulting image would probably be visually meaningless. Thus, whilst the original video data represents multiple pixels which together define an image frame or field, the compressed data corresponding thereto can be regarded as a block of data (referred to hereinafter as a file of data) having a known mathematical relationship to the data in the frame of data.

The amount of data compression that can be achieved depends on characteristics of the image. For example for a given compression, a frame of data representing a noisy picture such as a crowd scene will result in a much larger file of data than will a frame of data representing a quiet picture such as a screen of uniform colour. Consider the simple example of data compression by run length encoding wherein an image is defined by identifying groups of pixels in scan order having the same colour value (say 12 red pixels, followed by 7 green pixels, followed by 9 brown pixels and so on). In the case of a frame of data representing a uniform colour, that data can be reduced to a file of data comprising just a few bytes which define a group of approximately 800 thousand pixels (i.e. all pixels in the image) as having a given colour value. However, in the case of a frame of data representing a crowd scene the colour value of adjacent pixels can vary considerably and in the extreme a run length encoding of the frame of data would produce a file in which the colour of each pixel is individually defined, the file therefore containing more bytes of data than the original frame of data.

Run length encoding is a crude compression technique but more sophisticated approaches are available for use in the compression of video data, such as so-called JPEG compression and fractal compression. It is preferable to use these more sophisticated techniques in the compression of data representing video images because when the data is subsequently decompressed there is in many instances little discernable loss in the quality of the image represented thereby. However, these techniques too are sensitive to the characteristics (noisiness) of the picture. Consequently, compression of a frame of data representing a quiet picture will result in a smaller file of data than will the same compression of a frame of data representing a noisy picture. Consequently, when the degree of compression is fixed, compression of the frames of data in a video sequence will result in a series of files of data of varying size.

The storage of files of variable size in a random access store is not something that can easily be done efficiently. One way in which files of variable size may be stored randomly is by determining the largest possible size of file that will be produced from a frame of data representing the noisiest of images and allocating that amount of storage space to each file that is produced by the compression regardless of the actual size of the file. In the majority of cases video images will be less noisy than the worst case and the corresponding file of data will be smaller than the amount of space allocated to it. Consequently, not all of the storage space will be utilised in the storage of files of data, and this is wasteful of storage space. Where storage space is at a premium the degree of compression can be increased so that less space is required and need be allocated to each file of data. However, this approach results in unnecessarily high compression of frames of data representing quiet images and this in turn can result in the introduction of unwanted and visible artifacts in the quiet image represented by the subsequently decompressed frame of data.

The degree of compression applied to a frame of image data representing a given image to produce a file of data representing the image data in compressed form may be defined as a compression factor. For a given image, the greater the compression factor the more compressed is the data and the smaller therefore is the required file size. Thus, for a particular compression factor, if the image is a simple image, i.e. relatively quiet, it will require a smaller storage capacity than would be the case if the image were a complex image, i.e. relatively noisy. It should be appreciated from this that the term "compression factor" does not in fact relate to the ratio between the amount of data in a frame and the amount of data in the corresponding file resulting from the compression since the amount of data in the file will depend on the noisiness of the image as well as depending on the manner in which the data is compressed. Correctly, the expression "compression factor" refers to the amount of work that is done by the compression technique in compressing a frame of image data to produce a file of data, which work produces smaller files for relatively quiet images and larger files for relatively noisy images.

Thus, for a sequence of video images for example of a moving scene a range of different file sizes would be called for to store the sequence for a given degree of compression. As mentioned previously herein the storing of files of different sizes is an unattractive option because a uniform file size store considerably simplifies the filing structure of a machine where the permanent store is a disc store for which random access is provided and which can record to and delete from the store individual images of video. The use of a fixed file store also maintains the family similarity with machines in which the stored images are not compressed.

SUMMARY

The present invention therefore aims to afford an improved video image processing system in which files of data relating to images of an input image sequence are stored after compression.

The invention also aims to afford a video image processing system in which video data representing a sequence of video images is processed for storage in a compressed form, the system being arranged to compress the data for incoming video images, to examine the compressed data for each image in order to determine whether compression is optimal and to recompress the data for an image using different compression parameters where the compression is found not to be optimal.

The present invention consists in a video image processing system comprising: an input store for temporarily storing input video data representing plural images of an input video sequence; data compressing means for compressing in sequence each image of the video data stored in the input store to a given initial degree to produce respective data files each comprising multiple bytes of compressed data representing the input video data in compressed form, the compressing means operating to compress the video data at a rate faster than that at which it is input for storage in the input store; an output store comprising multiple storage areas of known fixed size for temporarily storing for output respective files of compressed data produced by the data compressing means; and processing means for comparing the number of bytes in each data file with the known size of one storage area in the output store to determine whether the data file will occupy a predetermined proportion of said storage area in the output store, for adjusting the operation of the data compressing means to vary the degree of compression in the event that the data file will not occupy said predetermined portion of said storage area, and for causing the compressing means to effect one or more repeat compressions to said varied degree in order to produce and store in a respective area of the output store a data file of a size which will occupy said predetermined proportion of said storage area the system thereby optimising the compression of data and the utilisation of storage in the storing of the compressed data.

Preferably, the data compressing means is arranged such that the initial degree of compression applied to an image of the video sequence is equal to that applied to the previous image of the video sequence which enabled the data file produced therefrom to occupy a said predetermined proportion of said storage area.

Advantageously, the input video data represents a multiplicity of picture elements which together form a field in the input video sequence.

Alternatively, the input video data represents a multiplicity of picture elements which together form a frame in the input video sequence.

Preferably, the input store and the output store each comprises a cache store.

Suitably, the input store and the output store each comprises a random access storage device.

In one form of system embodying the invention, the data compressing means comprises first and second data compressors which cooperate to enable said one or more repeat compressions to be effected on data representing a given image of the input video sequence by one of said first and second data compressors while data representing a successive portion of the input video sequence is being compressed by the other of said first and second data compressors.

According to a preferred feature the processing means is arranged to determine the degree of compression required for repeat compression of an image by way of a predictive algorithm.

Preferably, said predictive algorithm is a function of the degree of data compression applied to the input image data in the compression preceding the repeat, and amount of data in the data file produced by the compressing means in the compression preceding the repeat and the size of storage area in the output store.

Suitably, the predictive algorithm is given by $$Q' = Q \left( \frac{\text{storage needed}}{\text{storage available}} \right)^{\alpha}$$

where $Q'$=the degree of compression required for a repeat compression of the image data, $Q$=the degree of compression applied to the image data in the compression preceding the repeat compression, $\alpha$=is an empirically determined constant, the "storage needed" is the amount of data, in terms of the number of bytes, in the file produced by the compression executed to the degree Q by the compressor to create that file of data, and the "storage available" is the amount of storage space, in terms of the number of bytes, available in a storage means for storing a file of data.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings.

In the accompanying drawings the single

DETAILED DESCRIPTION

Figure 1:
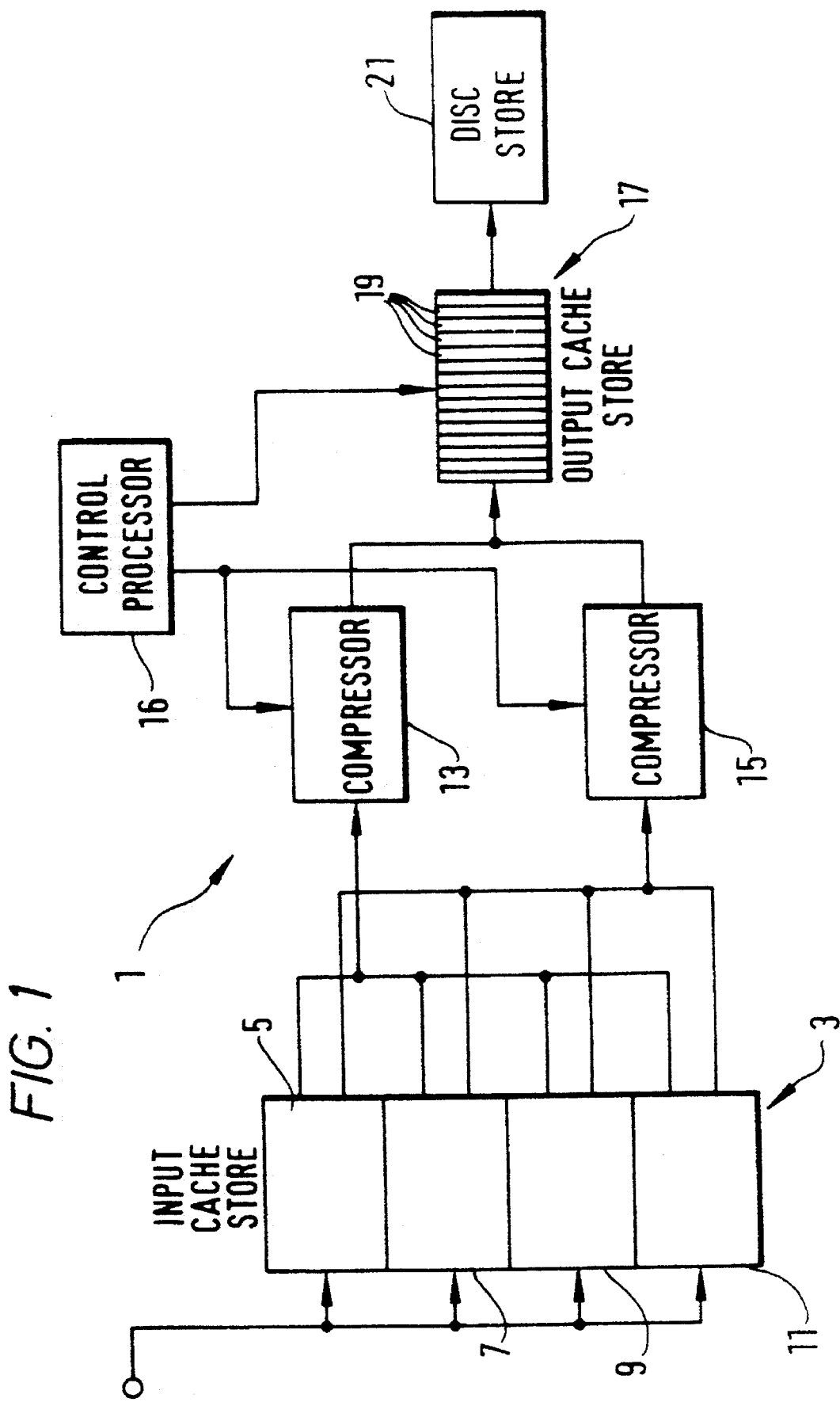
FIG. 1 illustrates elements of a video processing system in which frames of image data are compressed to produce files of compressed data for storage in a storage device.

Referring to the drawing, in a video processing system 1 a sequence of fields of video, suitably moving video, in which each field is represented by digital data, is supplied from a video source (not shown) to an input cache store 3 in which the fields are stored in separate field storage areas 5, 7, 9, 11, the number of which depends on the number of repeat compressions of each field that the system is required to provide for. Pairs of successive fields comprise respective frames of the video sequence. The input digital video data can be randomly input to the field store areas 5, 7, 9, 11 so that once data for one field has been processed it can be replaced with new data for subsequent processing.

Two compressors 13 and 15 are provided each of which can randomly access each of the field store areas 5, 7, 9, 11 and together effect compression of accessed fields of data at a speed greater than that at which the data representing the fields are supplied to the cache store 3. As will be described in greater detail hereinafter, the compressors 13, 15 operate under the control of a processor 16 to read a field of data from the store area 5, 7, 9, 11 of the cache store 3 and apply data compression thereto to produce a file of compressed data relating to the field of data.

The data files for each field from the compressors are supplied under the control of the processor 16 to an output cache store 17 having multiple file storage areas 19 for storing respective data files for each of the video fields, the file storage areas 19 being of equal capacity. The output cache store 17 under the control of the processor 16 supplies files of data contained in the file storage areas 19 to a disc store 21 or other form of permanent storage, for example a video tape recorder.

The manner of operation of the two compressors 13, 15 is as follows. Once the loading of data representing the first field of the first frame of the sequence into field storage area 5 is completed, loading of data representing the second field commences into field storage area 7 as does compression of the data representing first field by compressor 13. Data is read from the cache store 3 to a compressor 13 or 15 where it is compressed at a speed which is at least equal to and preferably somewhat higher than the rate of supply data representing the fields of the sequence to the cache store 3. Compressed data is output from the compressor 13 for storage in a file storage area 19 in the output cache store 17.

If the degree of compression imparted to the first field of data is such that the number of bytes in the compressed data file is between predetermined limits, i.e. those which will give satisfactory occupation of the file being filled, e.g. between 80% and 100% of the size of the storage area 19, the compression of the second field of data takes place by compressor 12 whilst loading of the next field of data into area 9 of the cache store 3 takes place. By virtue of its speed of processing being at least equal to and preferably greater than the rate at which data for each of the fields is input to the cache store 3, compressor 13 is available, so long as no repeat compressions are needed, to handle the next data field compression.

Suppose, however, that the field of data from area 5 of the cache store 3 needs a repeat compression because the amount of data in the resulting file does not satisfactorily occupy the storage area 19 allocated to it. In this case, what happens is that the first field of data in the storage area 5 is output again and compression thereof is again effected by the compressor 13. This time, however, if the resulting file was too big a greater degree of compression is applied to the field of data in order to produce a file of data which is smaller than that produced by the previous compression and if the resulting file was too small a lesser degree of compression is applied. The repeat compression of the first field can begin again as soon as the processor 16 establishes that the file of data produced by the previous compression is too large or too small.

As soon as the data for the second field has been stored in the storage area 7 it can start to be output to the compressor 15 for compression thereby. By the time that data for the third field has been stored in the storage area 9, compression (including any repeat compression) of the data for the first field should be complete and the compressor 13 is therefore available to compress the third field of data. Likewise, by the time that data for the fourth field has been stored in storage area 11, compression (including any repeat compression) of the data for the second field should be complete making available the compressor 15 for compression of the fourth field of data.

Occasionally, as will be explained in more detail hereinbelow, it may be necessary for a compression to be repeated for a second time on a field of data. This does not present any problems because the compressors 13, 15 together compress data at a faster rate than that at which the data is delivered to the input cache store 3. Consequently, any further delay resulting from a second repeat compression can normally be made up by the two compressors for within a few field periods. In other words, the fields supplied to the store 3 are effectively in a queue and the compressions and repeat compressions of the fields are handled by the compressor which is available at the time a compression or repeat compression is required to be effected, The initial compression factor applied to the data for each of the fields of the sequence is equal to that which was employed with the data for the preceding field to achieve the compression thereof at which it was loaded into its file 19. In a video sequence it is not unreasonable to assume that the content of a given image field will not differ significantly from that of the preceding field. In most cases this will be true unless the video sequence contains a cut or other edit point where the contents of fields on each side may differ considerably. However, even when there is an edit point this assumption provides a useful starting point for determining the degree of compression to be applied, as will become clearer from the following.

Whilst a fie of data is being loaded into an area 19 in the output cache store 17 from one or other of the compressors 13, 15, the processor 16 counts the number of bytes of data being output from the compressor. If that number of bytes in a file is above or below predetermined limits e.g. above 100% or below 80% of the size of the area 19 the processor 16 will instruct the relevant compressor 13 or 15 to alter the degree of compression effected thereby according to a predictive algorithm. One suitable algorithm is as follows.

$$Q' = Q \left( \frac{\text{storage needed}}{\text{storage available}} \right)^{\alpha}$$

where

Q'=the degree of compression required for a repeat compression to the image data, Q=the degree of compression applied to the image data in the compression preceding the repeat compression, α=is an empirically determined constant, a suitable value of which being 1.33, the "storage needed" is the amount of data, in terms of the number of bytes, in the file produced by the compression executed to the degree Q by the compressor to create that file of data, and the "storage available" is the amount of storage space, in terms of the number of bytes available in the area 19 in the cache store 17 for storing a file of data.

Accordingly, the repeat compression, if required, is carried out under a degree of compression calculated from the value of the compression preceding the repeat multiplied by a factor which comprises a ratio of the number of bytes counted by a processor divided by the number of bytes equivalent to the capacity (or a predetermined proportion of the storing of the file, such ratio being raised to the power of an empirically determined constant $\alpha$.

In some circumstances for example where the field to be compressed occurs at a cut or other edit point in the input video sequence, more than one repeat compression of the data of one or more of the fields of the sequence may be needed to achieve satisfactory utilisation of the storage area into which the corresponding file of compressed data is to be loaded. In such circumstances value of Q' for the second or subsequent compression is the degree of compression applied to the field of image data in the compression preceding the second or subsequent repeat compression.

The size of available storage is fixed and is therefore known. The processor counts the number of bytes of compressed data in a file as it is output from the appropriate compressor 13 or 15 for input to a storage area 19 in the output cache store 17. If the number of output bytes exceeds the size of available storage locations then clearly the file is too large and it will be necessary to repeat the compression with a higher degree of compression. As soon as the number of output bytes from the appropriate compressor 13 or 15 exceeds the amount of available storage for a file, the processor 16 causes the compressor to cease operation. Similarly, if the total number of bytes in a file is less than a predetermined minimum e.g. 80% of the total space in the area 19 it will be necessary to repeat the compression with a lower degree of compression. The processor also calculates a new value of Q' and operation of the compressor is adjusted accordingly. The repeat compression is then executed on the same field of data as previously to produce a file of data which has been subject to, as appropriate, a greater or lesser degree of compression than the file preceding it.

In order to avoid excessive repeat compressions a retry limit may be set to limit the number of repeats to an acceptable number, e.g. no more than five retrys. Then, if the retry limit of the system is reached, a default value of Q is employed which ensures that the file of compressed data will fit into the storage area 19 of the output store 17 allocated for the purpose.

It will be apparent that a single higher speed compressor rather than the two illustrated may be employed. However, the need to repeat compressions loses time and may cause the compression hardware to fail to keep up with the speed of supply, which may be in real time, of data representing video fields to the field store areas of cache store 3. The provision of large cache stores 3 and 17 helps but when a single compressor is employed, the system will only cope with occasional repeats. The employment of two compressors allows a second repeat compression for every field though, because of the success of the predictive algorithm, this does not actually often happen. The system illustrated allows easily for occasional multiple repeat compressions.

It will be appreciated that the system operates so that the number of bytes of data in each file tends to be equalised with the result that the average quality of replay is improved compared with the case where the compression factor applied is fixed and chosen to accommodate the most complex image and has the appearance of uniformity.

During replay an image decompressor must be set up to match the compression factor which was used to compress the image file it is about to decompress. This can be achieved by storing compression factor data in a header attached to the front of each compressed data file when it is stored in the disc store 21.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. A video image processing system comprising:

an input store for temporarily storing input video data representing plural images of an input video sequence;

data compressing means for compressing in sequence each image of the video data stored in the input store to a given initial degree to produce respective data files each comprising multiple bytes of compressed data representing the input video data in compressed form, the compressing means operating to compress the video data at a rate faster than that at which it is input for storage in the input store;

an output store comprising divisions of like by storage capacity temporarily storing for output respective files of compressed data produced by the data compressing means; and processing means for comparing the number of bytes in each compressed data file with the byte storage capacity of one said division of the output store to determine whether the compressed data file will:

occupy at least a desired fraction of the byte storage capacity of said one of said divisions of the output store, or less than said fraction of said one of said division, or exceed the storage capacity of one of said divisions, and for causing the compressing means when the compressed data file comprises fewer bytes than are required for occupancy of at least said fraction of the byte storage capacity of said one of said divisions or comprises more bytes than the byte storage capacity of said one of said divisions, to effect at least one repeat compressions to adjust the number of bytes in the compressed data file so that the ratio of said number of bytes of the recompressed data file to the byte capacity of said one of said divisions amounts to at least said desired fraction, thereby optimizing the utilization of storage in the output store.

2. A video image processing system as claimed in claim 1, wherein the data compressing means is arranged such that the initial degree of compression applied to an image of the video sequence is equal to that applied to the previous image of the video sequence which enabled the data file produced therefrom to occupy a said predetermined proportion of said storage area.

3. A video image processing system as claimed in claim 1, wherein the input video data represents a multiplicity of picture elements which together form a field in the input video sequence.

4. A video image processing system as claimed in claim 1, wherein the input video data represents a multiplicity of picture elements which together form a frame in the input video sequence.

5. A video image processing system as claimed in claim 1, wherein the input store and the output store each comprises a cache store.

6. A video image processing system as claimed in claim 1, wherein the input store and the output store each comprises a random access storage device.

7. A video image processing system as claimed in claim 1, wherein the data compressing means comprises first and second data compressors which cooperate to enable said one or more repeat compressions to be effected on data representing a given image of the input video sequence by one of said first and second data compressors while data representing a successive image of the input video sequence is being compressed by the other of said first and second data compressors.

8. A video image processing system as claimed in claim 1, wherein the processing means is arranged to determine the degree of compression required for repeat compression of an image by way of a predictive algorithm.

9. A video image processing system as claimed in claim 8, wherein said predictive algorithm is a function of the degree of data compression applied to the input image data in the compression preceding the repeat, and amount of data in the data file produced by the compressing means in the compression preceding the repeat and the size of storage area in the output store.

10. A video image processing system as claimed in claim 8, wherein the predictive algorithm is given by $$Q' = Q \left( \frac{\text{storage needed}}{\text{storage available}} \right)^{\alpha}$$

where

Q'=the degree of compression required for a repeat compression of the image data, Q=the degree of compression applied to the image data in the compression preceding the repeat compression, $\alpha$=is an empirically determined constant, the "storage needed" is the amount of data, in terms of the number of bytes, in the file produced by the compression executed to the degree Q by the compressor to create that file of data, and the "storage available" is the amount of storage space, in terms of the number of bytes, available in a storage means for storing a file of data.

11. A video processing system as claimed in claim 1, wherein the image sequence represented by the data input to the input store comprises moving video.

* * * * *